Patented Feb. 5, 1946

2,394,195

UNITED STATES PATENT OFFICE 2,394,195

BARBITURIC COMPOUNDS

Samuel M. McElvain and Howard Burkett, Madison, Wis.

No Drawing. Application April 22, 1942, Serial No. 440,108

7 Claims. (Cl. 260—257)

This invention relates to barbituric compounds and more particularly to 5-(1-alkoxyvinyl)-5-substituted barbituric compounds.

The compositions of this invention are represented by the following formula:

(1) 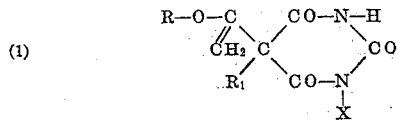

in which R is an ethyl or isoamyl radical, $R_1$ is an ethyl or allyl radical, and X is hydrogen (if the compound is an acid) or (if the compound is a salt) an alkali metal such as sodium, an equivalent of an alkaline-earth metal such as calcium, or ammonium or a substituted ammonium such as monoalkyl ammonium, for example $NH_3CH_3$, dialkyl ammonium, for example $NH_2(C_2H_5)_2$, and alkanol ammonium, for example $NH_3CH_2CH_2OH$.

The compositions of this invention are found to have unexpected properties. For example, sodium 5-(1-ethoxyvinyl)-5-ethyl barbiturate has a duration of anesthesia of approximately 600 minutes when the minimum anesthetic dose of that compound is administered intraperitoneally to rats. Sodium isoamyl ethyl barbiturate, a composition used extensively as an anesthetic and sedative, has a duration of anesthesia of 200 minutes when the minimum anesthetic dose is administered intraperitoneally to rats under identical conditions. This long period of anesthesia of 600 minutes is an extremely valuable property for the treatment of patients having constant pain such as that incident in the terminal stages of cancer.

The compositions of this invention are prepared by any one of the following methods:

A quantity of ketene diethyl acetal or ketene diisoamyl acetal is reacted with approximately one half its molecular equivalent of a dialkyl malonate and preferably diethyl malonate $[CH_2(COOC_2H_5)_2]$. The reactants are thoroughly mixed with a suitable catalyst, such as sodium ethoxide, and heated at between 125°–150° C. for about 12 hours. If the ketene acetal is ketene diethyl acetal, a mixture of dialkyl (1-ethoxyethylidene)-malonate and dialkyl (1-ethoxyvinyl)-malonate is formed; while if the ketene acetal is ketene diisoamyl acetal, a mixture of dialkyl (1-isoamyloxyethylidene)-malonate and dialkyl (1-isoamyloxyvinyl)-malonate is formed. The reaction which takes place when the dialkyl malonate is diethyl malonate and the ketene acetal is ketene diethyl acetal may be represented by the following equation:

(2) $CH_2=C(OC_2H_5)_2 + CH_2(COOC_2H_5)_2 \rightarrow$
$CH_3C(OC_2H_5)=C(COOC_2H_5)_2 +$
$CH_2=C(OC_2H_5)-CH(COOC_2H_5)_2$ The dialkyl (1-ethoxyethylidene)-malonate and the dialkyl (1-ethoxyvinyl)-malonate may be separated from each other by any suitable means, such as distillation or crystallization. Likewise, the dialkyl (1-isoamyloxyethylidene)-malonate and the dialkyl (1-isoamyloxyvinyl)-malonate may be separated from each other in similar manner. However, it is not necessary to separate them. Either the dialkyl (1-ethoxyethylidene)-malonate or the dialkyl (1-ethoxyvinyl)-malonate or a mixture of these two compositions, for example, may be alkylated by reacting the composition or the mixture with either ethyl halide or allyl halide in the presence of an alkali alkoxide, such as sodium isopropoxide, sodium ethoxide, or sodium tertiary butoxide. The ethyl or allyl halide, preferably the bromide, is reacted with the dialkyl (1-ethoxyethylidene)-malonate or with the dialkyl (1-ethoxyvinyl)-malonate, or with a mixture of the two in the presence of the alkali alkoxide. The alkylation may be conveniently performed by preparing a solution of the alkali alkoxide from about 0.1 mol of sodium in approximately 15 times its weight of anhydrous solvent alcohol, such as ethyl or isopropyl alcohol. To the solution is added 0.1 mol of the dialkyl malonate. The ethyl or allyl halide, and preferably the bromide, is added to this alkaline solution and the mixture is refluxed until it is neutral. During this time dialkyl (1-ethoxyvinyl)-ethyl-malonate or dialkyl (1-ethoxyvinyl)-allyl-malonate is formed. After cooling, sufficient water is added to dissolve all of the salt. The oily layer, which contains the dialkyl (1-ethoxyvinyl)-ethyl-malonate or dialkyl (1-ethoxyvinyl)-allyl-malonate, separates. The aqueous layer may be extracted with a suitable solvent, such as ether, and the extract added to the oily layer.

The reaction which takes place in the alkylation when a mixture of diethyl (1-ethoxyethylidene)-malonate and diethyl (1-ethoxyvinyl)-malonate is the starting material may be represented by the following equation:

(3) 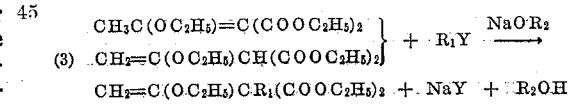

in which $R_1$ has the same meaning as heretofore defined, Y is a halogen and $R_2$ is a lower alkyl group.

The mixture of dialkyl (1-isoamyloxyethylidene)-malonate and dialkyl (1-isoamyloxyvinyl)-malonate may be alkylated in the same manner except that this mixture is substituted for the mixture of dialkyl (1-ethoxyethylidene)-malonate and dialkyl (1-ethoxyvinyl)-malonate in the procedure described.

The dialkyl (1-ethoxyvinyl)-$R_1$-malonate or the dialkyl (1-isoamyloxyvinyl)-R₁-malonate may be converted by condensation with urea to the corresponding barbituric acid as follows:

To an alcoholic solution of sodium ethoxide prepared from 0.2 mol of sodium with about 15 times its weight of absolute ethyl alcohol are added about 0.125 mol of urea and about 0.07 mol of the dialkyl (1-ethoxyvinyl)-R₁-malonate or dialkyl (1-isoamyloxyvinyl)-R₁-malonate. The mixture is refluxed about 12 hours, the alcohol removed by distillation and the residue dissolved in ice water. The aqueous solution is then extracted with a suitable solvent, such as ether. The water layer contains sodium 5-(1-ethoxyvinyl)-5-R₁-barbiturate or sodium 5-(isoamyloxyvinyl)-5-R₁-barbiturate. The resulting sodium salt is converted to the corresponding barbituric acid by acidification with a suitable mineral acid, such as hydrochloric acid. The 5-(1-ethoxyvinyl)-5-R₁-barbituric acid or the 5-(1-isoamyloxyvinyl)-5-R₁-barbituric acid is separated by any suitable means, such as filtration, and purified if desired by recrystallization.

Typical examples of the preparation of the compositions of this invention are as follows:

*Example 1.*—Preparation of 5-(1-ethoxyvinyl)-5-ethyl barituric acid.

One hundred fifty grams (1.3 mols) of ketene diethyl acetal, 105 g. (0.65 mol) of diethyl malonate, and 2.2 g. (0.03 mol) of sodium ethoxide are thoroughly mixed and heated in an oil bath at 125°–130° C. for 12 hours. The reaction mixture is then distilled. Approximately 95 g. (0.58 mol) of almost pure ethyl orthoacetate is collected. Then there is collected 5 g. of an intermediate fraction and finally approximately 130 g. of material, boiling point 96°–106° C. at 0.4 mm. pressure. This material having a boiling point of 96°–106° C. at 0.4 mm. comprises a mixture of diethyl (1-ethoxyethylidene)-malonate and diethyl (1-ethoxyvinyl)-malonate.

To a solution of 2.3 g. (0.1 mol) of sodium in about 15 times its weight of ethyl alcohol, there is added 23.0 g. (0.1 mol) of a mixture of diethyl (1-ethoxyethylidene)-malonate and diethyl (1-ethoxyvinyl)-malonate, having a boiling point of about 96° to 106° C. at 0.4 mm. pressure, the preparation of which has heretofore been described. There is then added to the reaction mixture 12.0 g. (1.1 mol) ethyl bromide. The mixture is refluxed until it is neutral. During this time diethyl (1-ethoxyvinyl)-ethyl-malonate is formed. The mixture is then permitted to cool and sufficient water is added to dissolve all of the sodium bromide. An oily layer separates which comprises the diethyl (1-ethoxyvinyl)-ethyl-malonate. The oily layer is separated and the aqueous layer extracted with ether. The ether extract is added to the oily layer and the combined ether extract and oily layer washed with water and dried over anhydrous sodium carbonate. The mixture is then fractionally distilled and the diethyl (1-ethoxyvinyl)-ethyl-malonate, having a boiling point of 130°–133° C. at 9 mm. pressure, obtained.

To an alcoholic solution of sodium ethoxide prepared from 4.6 g. (0.2 mol) of sodium and 75 ml. of absolute ethyl alcohol are added 7.5 g. (0.125 mol) of urea and 17 g. (0.065 mol) of diethyl (1-ethoxyvinyl)-ethyl-malonate. After the mixture has refluxed for 12 hours, the alcohol is removed by distillation and the residue dissolved in 80 ml. of ice water. During this time, sodium 5-(1-ethoxyvinyl)-5-ethyl barbiturate is formed. The aqueous solution which contains the sodium 5-(1-ethoxyvinyl)-5-ethyl barbiturate is then extracted with ether. To the water solution is added an excess of concentrated hydrochloric acid. The 5-(1-ethoxyvinyl)-5-ethyl barbituric acid precipitates and may be recrystallized from 50 percent ethyl alcohol. After recrystallization from 50 per cent ethyl alcohol the melting point of the 5-(1-ethoxyvinyl)-5-ethyl barbituric acid is about 189°–190° C. uncorrected.

*Example 2.*—Preparation of 5-(1-ethoxyvinyl)-5-allyl barbituric acid.

The 5-(1-ethoxyvinyl)-5-allyl barbituric acid is prepared in the same manner as in Example 1 except that instead of employing 12.0 g. of ethyl bromide 13.3 g. (1.1 mol) of allyl bromide is used. The boiling point of the diethyl (1-ethoxyvinyl)-allyl-malonate is 92°–96° C. at 0.1 mm. pressure. The melting point of the 5-(1-ethoxyvinyl)-5-allyl barbituric acid is about 153°–160° C. uncorrected.

*Example 3.*—Preparation of 5-(1-isoamyloxyvinyl)-5-ethyl barbituric acid.

The 5-(1-isoamyloxyvinyl)-5-ethyl barbituric acid is prepared in the same manner as the 5-(1-ethoxyvinyl)-5-ethyl barbituric acid described in Example 1, except that instead of employing 150 g. of ketene diethyl acetal, 260 g. (1.3 mols) of ketene diisoamyl acetal is used. The boiling point of the mixture of diethyl (1-isoamyloxyethylidene)-malonate and diethyl (1-isoamyloxyvinyl)-malonate is 120°–130° C. at 0.5 mm. pressure and the time of reaction to produce this mixture is 24 hours. The boiling point of the diethyl (1-isoamyloxyvinyl-ethyl-malonate is 104°–110° C. at 0.04 mm. pressure. The melting point of the 5-(1-isoamyloxyvinyl)-5-ethyl barbituric acid is about 153°–154° C. uncorrected.

Barbiturates may be readily obtained from the barbituric acids of this invention. These barbiturates are represented by Formula 1 above with X representing an alkali metal, ammonium, monoalkyl ammonium, dialkyl ammonium, or alkanol ammonium. These barbiturates may be obtained by the reaction of the 5-(1-ethoxyvinyl)-5-R₁-barbituric acid or 5-(1-isoamyloxyvinyl)-5-R₁-barbituric acid dissolved in a suitable solvent with either the hydroxide or ethylate of the desired metal, or with ammonia, or with the desired alkylamine or alkanolamine.

The sodium salts, for example, are represented by the following formula:

(4) 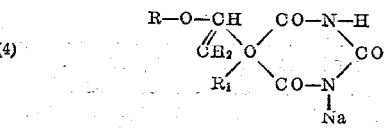

The other alkali salts have the same general formula except for the substitution of the other metals for sodium. These salts are prepared in the general way of preparing alkali metal salts from barbituric acids.

When the sodium salts are desired in a stable form sufficiently free from contaminants so that clear water solutions thereof, suitable for intravenous injection, may be obtained, they are produced by the methods disclosed in the U. S. Patent No. 1,856,792 issued to H. A. Shonle on May 3, 1932.

The ammonium and alkylamine and alkanolamine salts of 5-(1-ethoxyvinyl)-5-R₁-barbituric acids or 5-(1-isoamyloxyvinyl)-5-R₁ barbituric acids may be produced by the reaction of these respective acids with ammonia or with the desired amine in the usual manner of producing ammonium or alkylamine or alkanolamine barbiturates. Formulas of these birbiturates correspond in general to Formula 4 above except that NH4 or the proper substituted ammonium radical is substituted for sodium in that formula.

What is claimed is:

1. A barbituric compound which is represented by the following formula:

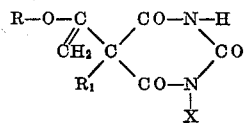

in which R is a radical selected from the class which consists of ethyl and isoamyl, R1 is a radical selected from the class consisting of ethyl and allyl and X is a member selected from the class consisting of hydrogen, the alkali metals, the equivalents of the alkaline-earth metals, ammonium, monoalkyl ammoniums, dialkyl ammoniums, and alkanol ammoniums.

2. A sodium barbiturate which is represented by the following formula:

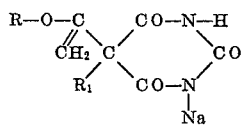

in which R is a radical selected from the class which consists of ethyl and isoamyl, and R1 is a radical selected from the class consisting of ethyl and allyl.

3. A barbituric acid which is represented by the following formula:

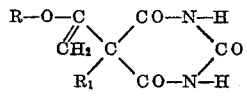

in which R is a radical selected from the class which consists of ethyl and isoamyl, and R1 is a radical selected from the class consisting of ethyl and allyl.

4. Sodium 5-(1-isoamyloxyvinyl)-5-ethyl barbiturate.

5. 5-(1-ethoxyvinyl)-5-allyl barbituric acid.

6. Sodium 5-(1-ethoxyvinyl)-5-ethyl barbiturate.

7. The process of making a barbituric compound which is represented by the following formula:

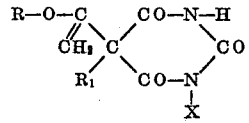

in which R is a radical selected from the class which consists of ethyl and isoamyl, R1 is a radical selected from the class consisting of ethyl and allyl, and X is a member selected from the class consisting of hydrogen, the alkali metals, the equivalents of the alkaline-earth metals, ammonium, monoalkyl ammoniums, dialkyl ammoniums, and alkanol ammoniums; which consists in reacting a ketene dialkyl acetal in which each alkyl group is a member of the class consisting of the ethyl and isoamyl groups with approximately a half molecular equivalent of a dialkyl malonate, alkylating the resultant dialkyl (1-alkoxyalkylidene)-malonate by treating it in the presence of an alkyl alkoxide with a halide of the class consisting of ethyl halide and allyl halide, and condensing the resultant dialkyl (1-alkoxyvinyl)-R1-malonate with urea.

SAMUEL M. McELVAIN.
HOWARD BURKETT.